United States Patent [19]
Hasuda et al.

[11] Patent Number: 5,986,383
[45] Date of Patent: Nov. 16, 1999

[54] DRIVE DEVICE AND INFORMATION RECORDING AND PROCESSING DEVICE

[75] Inventors: Masanori Hasuda; Tadao Takagi, both of Yokohama, Japan

[73] Assignee: Nikon Corporation, Tokyo, Japan

[21] Appl. No.: 08/992,095

[22] Filed: Dec. 17, 1997

[30] Foreign Application Priority Data

Dec. 17, 1996 [JP] Japan .................................. 8-336577
Dec. 10, 1997 [JP] Japan .................................. 9-339565

[51] Int. Cl.$^6$ .................................................. H01L 41/08
[52] U.S. Cl. .......................... 310/317; 310/323; 310/328
[58] Field of Search ................................. 310/317, 323, 310/328

[56] References Cited

U.S. PATENT DOCUMENTS

| | | | |
|---|---|---|---|
| 4,755,705 | 7/1988 | Holum | 310/328 |
| 5,225,734 | 7/1993 | Nakanishi | 310/323 |
| 5,332,941 | 7/1994 | Honda | 310/323 |
| 5,852,336 | 12/1998 | Takagi | 310/323 |
| 5,866,970 | 2/1999 | Oone et al. | 310/323 |

FOREIGN PATENT DOCUMENTS 7-143770 6/1995 Japan .

OTHER PUBLICATIONS

"Piezoelectric Linear Motors for Application to Driving a Light Pick–Up Element", Tomikawa et al., 5th Symposium on Dynamics Related to Electromagnetic Force, Collected Pagers, pp. 393–398, Jun. 9–11, 1993 (partial translation).

"*Vibiromotors For Precision Microrobots*", K. Ragulskis et al., Hemisphere Publishing Corp. (1988), pp. 5–8, 11–14, 270–272.

*Primary Examiner*—Nestor Ramirez
*Assistant Examiner*—Judson H. Jones
*Attorney, Agent, or Firm*—Oliff & Berridge, PLC

[57] ABSTRACT

A drive device includes a base and a driven member placed on the base. The driven member is capable of rotation on the base and has a circular surface following the direction of rotation. A roller member contacts the outside or inside of the circular surface of the driven member and is supported to be capable of rotation together with the driven member. A vibration actuator contacts the roller member and drives the roller member to rotate. A pressing member presses the vibration actuator in a direction substantially perpendicular to the axis of rotation of the driven member. The pressing member presses the vibration actuator against the roller member, which in turn is pressed against the driven member.

20 Claims, 13 Drawing Sheets

DRIVE DEVICE AND INFORMATION RECORDING AND PROCESSING DEVICE

The disclosures of the following publications and applications are herein incorporated by reference:

(1) 222 Piezoelectric Linear Motors for Application to Driving a Light Pick-Up Element, by Tomikawa et al., 5th Symposium on Dynamics Related to Electromagnetic Force, Collected Papers, pages 393–398, Jun. 9–11, 1993.

(2) Japanese Laid-Open Patent Application No. 7-143770.

(3) U.S. patent application Ser. No. 08/377,466 (which is based on JP7-143770).

BACKGROUND OF THE INVENTION

1. Field of Invention

The present invention relates to a drive device for driving a member to rotate using a vibration actuator. The present invention also relates to an information recording and processing device for performing reading and/or writing of information by causing an information recording medium to rotate using the drive device.

2. Description of Related Art

In the past, when rotatably driving a disk such as a turntable using a vibration actuator, a disk shaped vibration actuator that rotated was used.

This vibration actuator is provided at least with a disk (rotor) and an elastic member (stator) for driving the disk to rotate. A piezoelectric element caused vibration in the elastic member, and a pressing member pressed the disk into contact with the elastic member. These constituent elements are stacked in sequence in the direction of the axis of rotation of the disk.

However, in this type of structure, because the disk, elastic member, piezoelectric element, and pressing member, and the like, are stacked in sequence in the direction of the axis of rotation of the disk, the space in the direction of the axis of rotation of the disk must be made large. Therefore, when the vibration actuator is incorporated into an information recording and processing device (e.g., a disk drive), it becomes difficult to make the size of this processing device compact in the direction of the aforementioned axis of rotation.

Also, because the disk is pressed in the direction of the axis of rotation by the pressing member, its position may change in the direction of pressing (i.e., as the pressing member is compressed or expanded in the pressing direction). Therefore, there is the possibility that the depth of focusing of the head for reading/writing the information by projecting a light beam on the surface of the disk may change.

SUMMARY OF THE INVENTION

One object of the present invention is to provide a drive device that is capable of being made compact in the direction of its thickness. Another object of the present invention is to provide an information recording and processing device for which stable reading/writing operations are possible using the aforementioned drive device.

In order to achieve the above and other objects, according to one embodiment of the present invention, a drive device includes a base and a driven member placed on the base. The driven member is capable of rotation on the base and has a circular surface following the direction of rotation. A roller member contacts the outside or inside of the circular surface of the driven member and is supported to be capable of rotation together with the driven member. A vibration actuator contacts the roller member and drives the roller member to rotate. A pressing member presses the vibration actuator in a direction substantially perpendicular to the axis of rotation of the driven member. The pressing member presses the vibration actuator against the roller member, which in turn is pressed against the driven member.

Preferably, the vibration actuator includes a rectangular flat vibration element that generates an elliptical movement in a specified portion of the vibration element by causing a longitudinal vibration and a bending vibration in the vibration element. The vibration element drives the roller member to rotate by the elliptical movement.

The driven member and the vibration actuator can be disposed on the identical plane substantially orthogonal to the axis of rotation of the driven member.

The roller can be mounted such that the axis of rotation of the roller member can move in relation to the base.

The base can be formed in a rectangular flat shape, and the vibration actuator can be disposed in a corner of the base.

The drive device can be used in an information recording and processing device for performing reading and/or writing of information against an information recording medium. In particular, the driven member can be the information recording medium or a turntable on which the information recording medium is installed.

Additionally, a roller support member for supporting the aforementioned roller member can be provided. This roller support member can be configured with an axis member fixed on the aforementioned base and a main body supported on the axis member so as to be capable of rotation centered on the axis member. The axis of rotation of the roller support member can be supported by the main body. The main body of the supporting member can be supported within a surface substantially parallel to the surface orthogonal to the axis of rotation of the driven member so as to be capable of rotation centered on the axis member.

The vibration actuator can be a type having a first driving force output member and a second driving force output member. In this case, the roller member can include a first roller in contact with the first driving force output member and a second roller in contact with the second driving force output member. Also, the roller support member can include a first roller support member and a second roller support member for independently supporting the first roller and the second roller, respectively.

When the vibration actuator has a first driving force output member and a second driving force output member, the roller member can include a first roller in contact with the first driving force output member and a second roller in contact with the second driving force output member. The main body of the roller support member can include a first member supported on the axis member fixed to the base so as to rotate centered on the axis member, a second member supporting the axis of rotation of the first roller and the axis of rotation of the second roller, and a linking member linking the first member and the second member to be capable of mutual rotation.

In a configuration in which the vibration actuator has a first driving force output member and a second driving force output member, and the roller member can have a first roller in contact with the first driving force output member and a second roller in contact with the second driving force output member, a first support member and a second support member for supporting the driven member. The first support member can be disposed in a position symmetrical to the center of the first roller and the driven member, and the second roller can be disposed in a position symmetrical to the second roller and the driven member.

Furthermore, the driven member may be provided with a first part having a first diameter and a second part having a second diameter smaller than the first diameter, and the roller member can be configured so as to contact the driven member at the second part.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
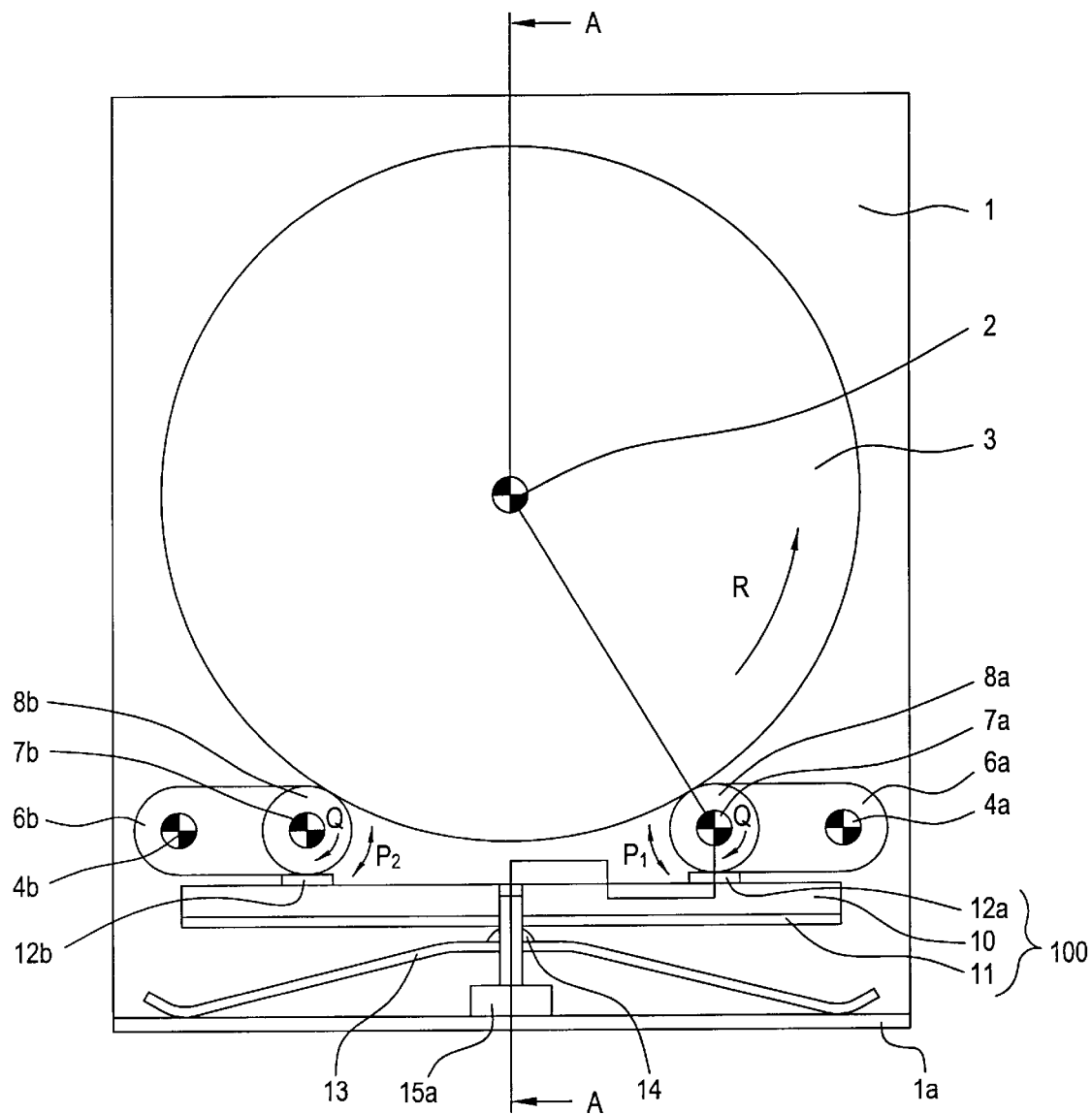
FIG. 1 is a plan view showing a first embodiment of a drive device according to the present invention.
Figure 2:
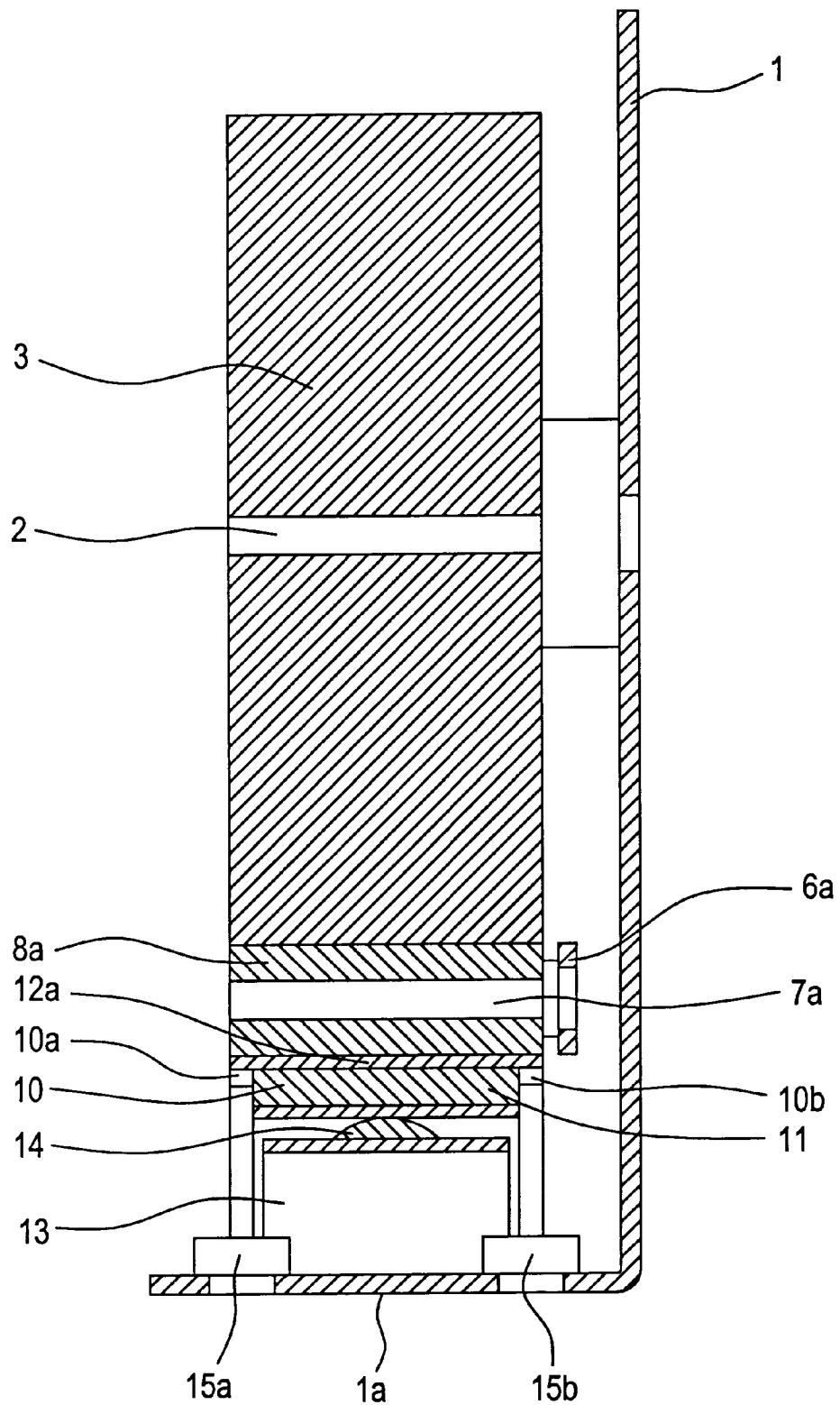
FIG. 2 is a cross-sectional view along A—A in FIG. 1.
Figure 3:
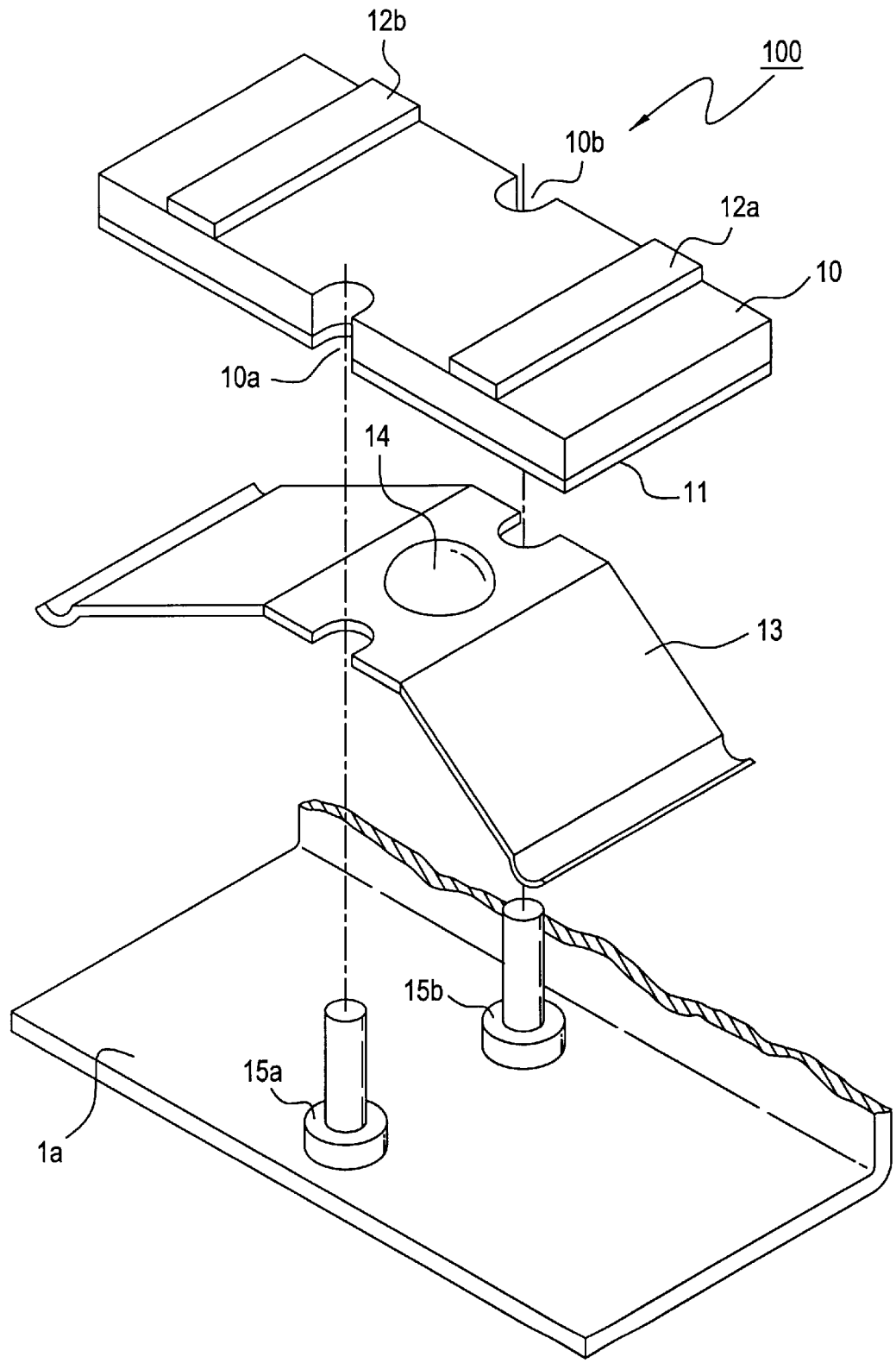
FIG. 3 is a perspective view specifically showing a vibration actuator of the drive device according to the first embodiment.

FIG. 1 is a plan view showing a first embodiment of the drive device of the present invention. FIG. 2 is a cross-sectional view along A—A of the drive device in FIG. 1. FIG. 3 is a perspective view specifically showing a configuration of a vibration actuator of the drive device according to the first embodiment.

In the present description, the drive device is explained using as examples an information recording and processing device for mounting and driving an information recording medium such as a CD (compact disk), MD (mini disk), DVD (digital video disk), and LD (laser disk), and reading/writing information on that information recording medium.

Base 1 is a one-piece fixed member, e.g., a part of the case (housing) of the information recording and processing device. An axis (or shaft) 2 is attached to the base 1. The axis 2 supports a disk 3 so that disk 3 is capable of rotation. Disk 3 can be a turntable for mounting an information recording medium.

Axes (or shafts) 4a and 4b also are attached to base 1. A lever 6a is attached to axis 4a and is capable of rotation about axis 4a. Also, a lever 6b is attached to axis 4b and is capable of rotation about axis 4b. A roller 8a is attached by an axis (or shaft) 7a to the other end of lever 6a and is capable of rotation about axis 7a. Also, a roller 8b is attached by an axis (or shaft) 7b to the other end of lever 6b and is capable of rotation about axis 7b. By this configuration, lever 6a is capable of rotating centered on axis 4a on a surface substantially parallel to the surface orthogonal to axis 2. Also, lever 6b is capable of rotating centered on axis 4b on a surface substantially parallel to the surface orthogonal to axis 2. Therefore, roller 8a is supported centered on axis 4a so as to be capable of rotating (swinging) in the direction indicated by arrow P1. Also, roller 8b is supported centered on axis 4b so as to be capable of rotating (swinging) in the direction indicated by arrow P2.

Roller 8a and disk 3 are in contact with each other on their respective sides (outer surfaces). Also, roller 8b and disk 3 are in contact with each other on their respective sides (outer surfaces). Also, roller 8a and disk 3, and roller 8b and disk 3, are configured so as to rotate integrally (i.e., together). Axis 2 and axes 7a and 7b are disposed substantially parallel to each other.

Vibration actuator 100 includes a rectangular flat elastic member 10, a piezoelectric element 11, which is an electromechanical conversion element, attached (e.g., bonded) to the elastic member 10, sliding members 12a and 12b attached (e.g., bonded) to the force output portions of elastic member 10, and a pressing member (a spring) 13, and the like. The vibration actuator is configured such that, when a first drive signal having a specified frequency and voltage and a second drive signal having a different phase from the first drive signal are applied to piezoelectric element 11, a first-order longitudinal vibration, vibrating in the lengthwise direction of the elastic member 10, and a fourth-order bending vibration are generated in the elastic member 10. In the present embodiment, vibration actuator 100 is a so-called ultrasonic motor using vibrations in the ultrasonic region.

Such ultrasonic motors are known and are disclosed, for example, in "Longitudinal L1-Bending B4 Mode Flat-Plate Motor," disclosed in "222 Piezoelectric Linear Motors for Application to Driving a Light Pick-Up Element," 5th Symposium on Dynamics Related to Electromagnetic Force, Collected Papers, pages 393–398, in Japanese Laid-Open Patent Application No. 7-143770, and in U.S. Pat. application Ser. No. 08/377,466 (which is based on JP7-143770).

Vibration actuator 100 includes grooves 10a and 10b on both sides of elastic member 10, as shown in FIG. 3. Also, as shown in FIG. 2 (which is a cross-sectional view along A—A in FIG. 1) and FIG. 3, a pin 15a attached to the flange 1a of base 1 is inserted into groove 10a. Also, a pin 15b attached to the flange 1a of base 1 is inserted into groove 10b. Accordingly, vibration actuator 100 is supported so as to be capable of moving only in the direction of pins 15a and 15b.

Pressing member 13 is a plate-shaped spring member for pressing vibration actuator 100 in the direction of disk 3. This pressing direction is established in a direction substantially orthogonal to the axis of rotation 2 of disk 3. The pressing member 13 is disposed between vibration actuator 100 and the flange 1a of base 1. Also, a contact member 14 is attached to pressing member 13. Pressing member 13 is in contact with vibration actuator 100 via contact member 14.

The portions of elastic member 10 where the antinodes of the bending vibration generated in elastic member 10 are located function as force output members. When a fourth-order bending vibration is generated in elastic member 10, the antinodes of the bending vibration are formed in six locations including both ends of elastic member 10. In the case of the present embodiment, sliding members 12a and 12b are provided in two such places where the antinodes are located along the longitudinal direction excluding the aforementioned both ends. Sliding member 12a also is disposed in the position where elastic member 10 contacts roller 8a. Sliding member 12b also is disposed in the position where elastic member 10 contacts roller 8b. By such placement, when pressing member 13 pushes elastic member 10 in the direction of disk 3, sliding member 12a and roller 8a come into contact, and sliding member 12b and roller 8b come into contact. As a result, roller 8a and disk 3 come into contact, and roller 8b and disk 3 also come into contact.

Vibration actuator 100, roller 8a, and disk 3 are disposed in sequence next to each other on the identical plane substantially orthogonal to axis 2 of disk 3, as shown in FIG. 2. Roller 8b is not illustrated in FIG. 2, but is disposed in the same manner substantially on the identical plane.

Next, the operation of the drive device according to the first embodiment is explained.

A drive circuit (not illustrated) is connected to piezoelectric element 11 to apply alternating current voltage to the piezoelectric element 11. The drive circuit generates a first alternating current voltage (first drive signal) having a specified frequency and voltage and a second alternating current voltage (second drive signal) having a frequency and voltage equal to the first alternating current voltage and having a different phase. When the first alternating current voltage and second alternating current voltage are applied, piezoelectric element 11 generates a first-order longitudinal vibration and a fourth-order bending vibration in the elastic member 10, as described before. As a result, sliding members 12a and 12b provided on the force output members of the elastic member 10 move in an elliptical path (i.e., perform elliptical movement).

Because sliding member 12a performs an elliptical movement, roller 8a in contact with this sliding member 12a rotates centered on axis 7a. Also, because sliding member 12b performs an elliptical movement, roller 8b rotates centered on axis 7b. These rollers 8a and 8b rotate in the identical direction (for example, in the clockwise direction indicated by arrow Q in FIG. 1). At this time, disk 3 in contact with rollers 8a and 8b rotates in the reverse direction to rollers 8a and 8b centered on its axis 2 (for example, in the counterclockwise direction indicated by arrow R in FIG. 1).

The direction of rotation and speed of rotation of disk 3 can be varied by changing the phase between the first alternating current voltage and the second alternating current voltage applied to piezoelectric element 11, or the frequency, or the voltage, or the like.

According to the first embodiment, disk 3 can be driven to rotate by pressing vibration actuator 100 in contact with the side of disk 3 in a direction substantially orthogonal to axis 2. Therefore, vibration actuator 100, rollers 8a and 8b, and disk 3 can be disposed on the identical plane substantially orthogonal to axis 2 of disk 3. By this construction, it is possible to make the overall device compact in the direction of the axis 2 of disk 3. Also, the driving force generated by vibration actuator 100 is propagated efficiently to disk 3 by rollers 8a and 8b following the movement of disk 3.

If, for example, the length of elastic member 10 (refer to FIG. 1) is made to be 25 mm, the width of elastic member 10 (refer to FIG. 3) can be about 5 mm. Also, the length of the flange 1a of base 1 (that is, the width of the device) can be made to be about 7–8 mm.

Figure 4:
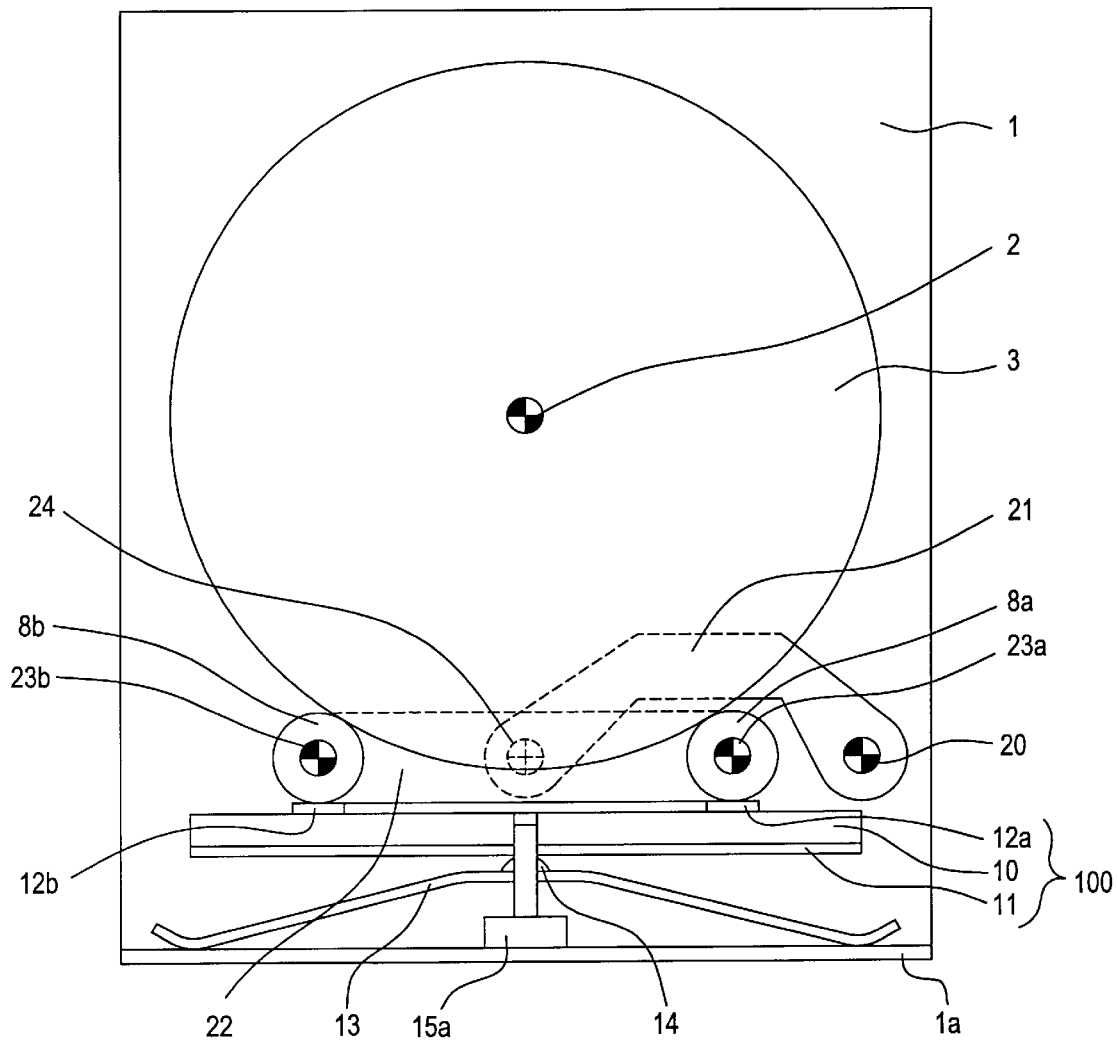
FIG. 4 is a plan view showing a second embodiment of a drive device according to the present invention.

FIG. 4 is a plan view showing a second embodiment of the drive device of the present invention. In each embodiment explained below, the identical symbols are assigned to the parts serving the same functions as in the first embodiment described before. Accordingly, redundant explanation thereof is omitted.

The second embodiment has a different support mechanism for rollers 8a and 8b compared with the first embodiment.

A lever 21 is attached so as to be capable of rotation (swinging) by rotatably attaching one of its ends to an axis (shaft) 20 attached to base 1. Also, an axis (shaft) 24 is attached to the other end of lever 21. A lever 22 is attached to axis 24 so as to be capable of rotation relative to lever 21 about axis 24.

Axes (shafts) 23a and 23b are attached to both ends of lever 22. Roller 8a is attached to axis 23a so as to be capable of rotation. Roller 8b is attached to axis 23b so as to be capable of rotation.

Also, roller 8a is in contact with sliding member 12a of vibration actuator 100, and roller 8b is in contact with sliding member 12b of vibration actuator 100. Furthermore, rollers 8a and 8b are in contact with the (outer) side of disk 3. Disk 3 is configured so as to be driven to rotate by vibration actuator 100 in the same manner as in the first embodiment.

In the second embodiment, axis 2 and axes 23a and 23b are disposed substantially parallel to each other. Also, vibration actuator 100, rollers 8a and 8b, and disk 3 are disposed on the identical plane substantially orthogonal to axis 2 of disk 3, in the same manner as in the first embodiment (refer to FIG. 2).

According to the second embodiment, levers 21 and 22 can be made longer compared with levers 6a and 6b in the first embodiment. Therefore, it becomes easy for rollers 8a and 8b to follow the movement of disk 3, making the operation more stable.

Figure 5:
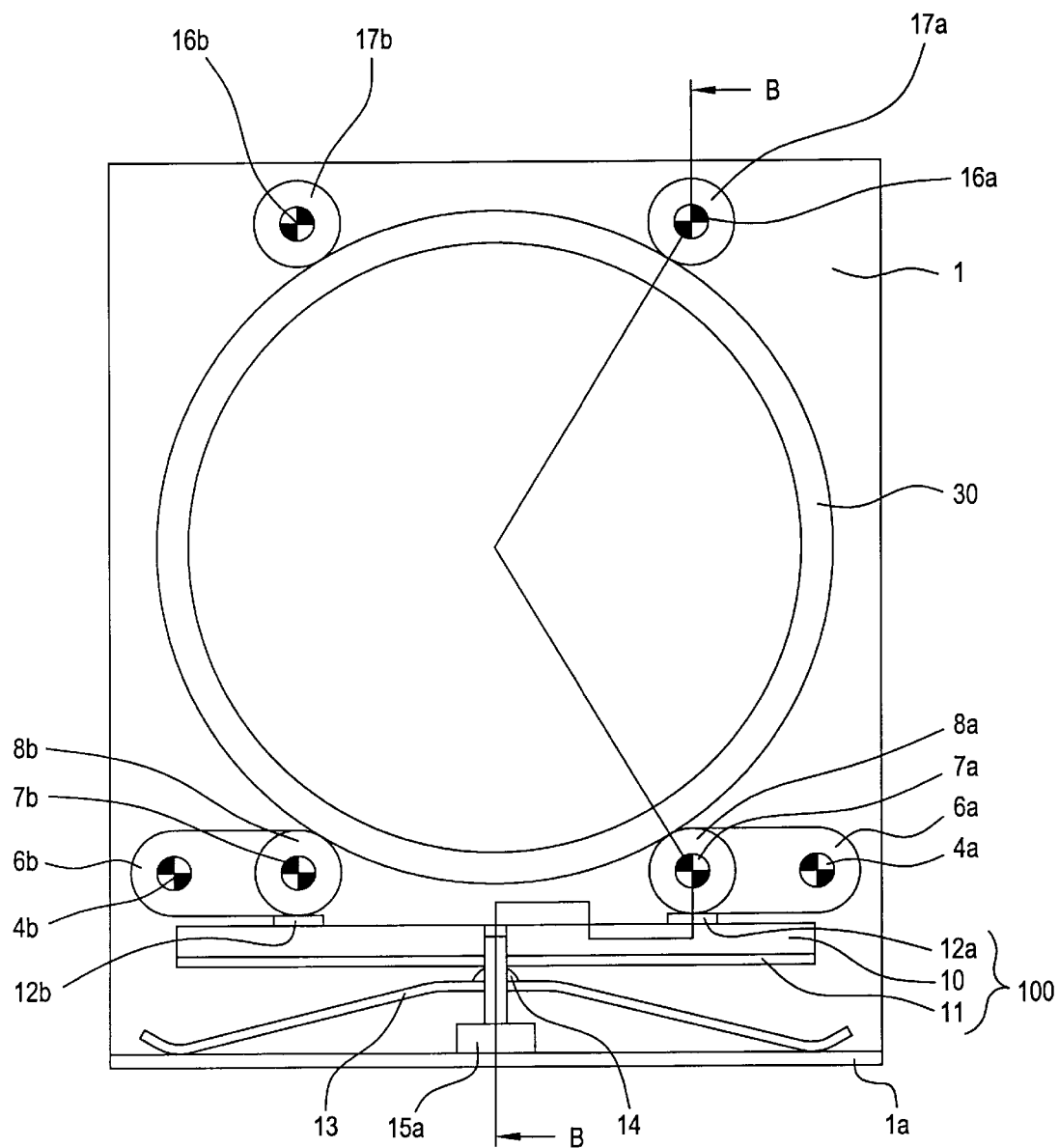
FIG. 5 is a plan view showing a third embodiment of a drive device according to the present invention.
Figure 6:
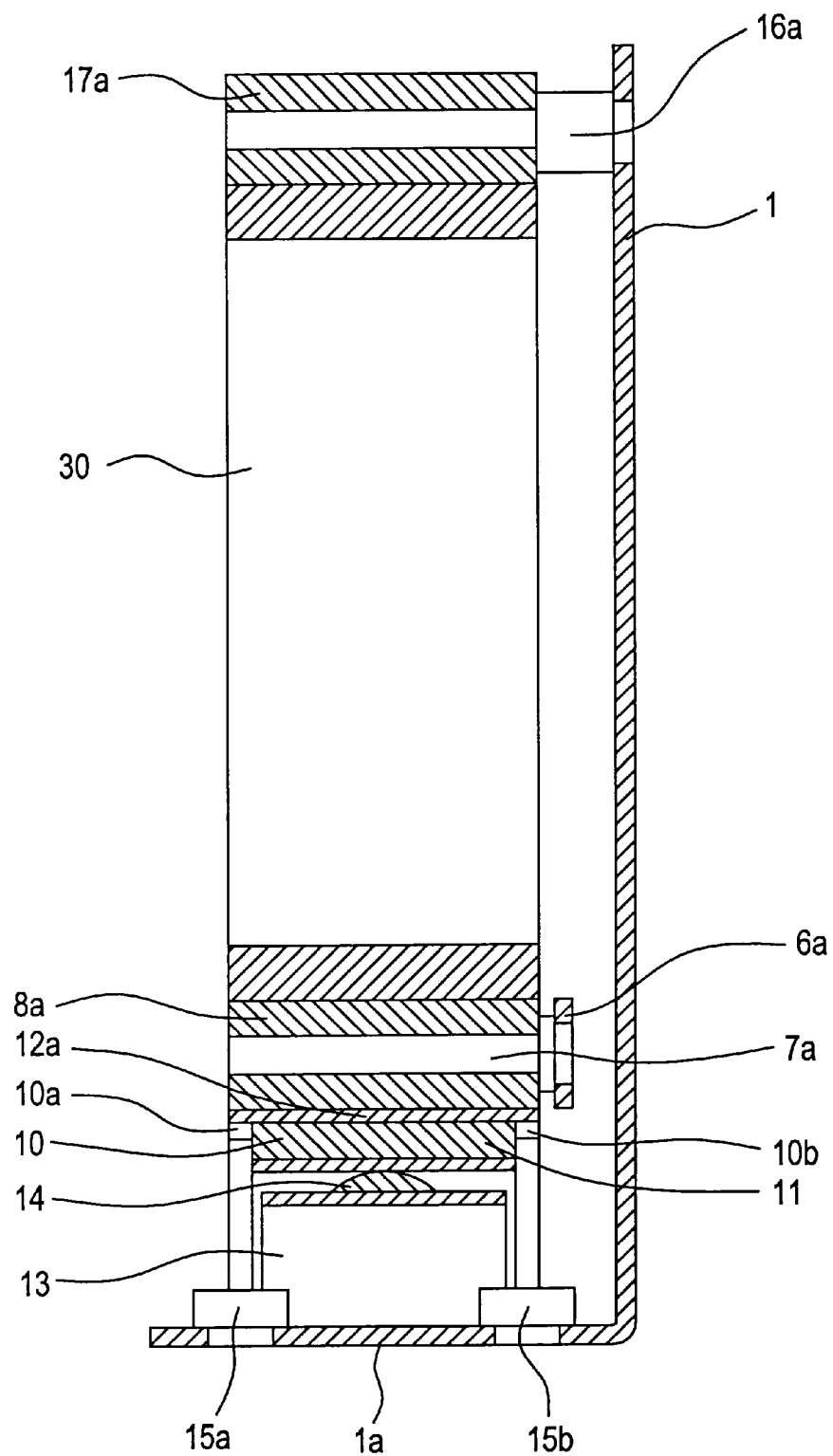
FIG. 6 is a cross-sectional view along B—B in FIG. 5.

FIG. 5 is a plan view showing a third embodiment of the drive device of the present invention. FIG. 6 is a cross-sectional view along B—B of the drive device in FIG. 5.

The third embodiment uses a cylindrical member 30 instead of the disk 3 of the first embodiment. Also, as opposed to the first embodiment in which disk 3 is supported by axis 2 disposed in its center, the third embodiment differs in that the cylindrical member 30 is supported by two rollers 17a and 17b mounted so as to be capable of rotation. Roller 17a is rotatably provided on axis (shaft) 16a provided on base 1, and roller 17b is provided so as to be capable of rotating on axis (shaft) 16b. These rollers 17a and 17b are disposed so as to come in contact with the outer perimeter of cylindrical member 30. Also, roller 17a is disposed in a position symmetrical to the center of roller 8b and cylindrical member 30. Similarly, roller 17b is disposed in a position symmetrical to the center of roller 8a and cylindrical member 30. In other words, a line passing through the centers of rollers 17a and 8b also passes through the center of rotation of cylindrical member 30. The same is true for a line passing through the center of rollers 17b and 8a. By such placement, stable support and pressing can be performed in relation to cylindrical member 30.

According to the third embodiment, member 30 can be supported stably even when configured so as to be pressed from the side by vibration actuator 100. Also, the space in the center part of cylindrical member can be used for placing the control circuit, and the like, on base 1. This is an advantage in that the freedom of design (layout) is increased.

Furthermore, because the center part of member 30 is not fixed, that center part can be used as a recording area. This design also is an effective structure when a disk-shaped information recording medium is used instead of the cylindrical member 30. In other words, the third embodiment can easily be used to directly drive a recording medium disk in that the disk can be substituted for cylindrical member 30.

Figure 7:
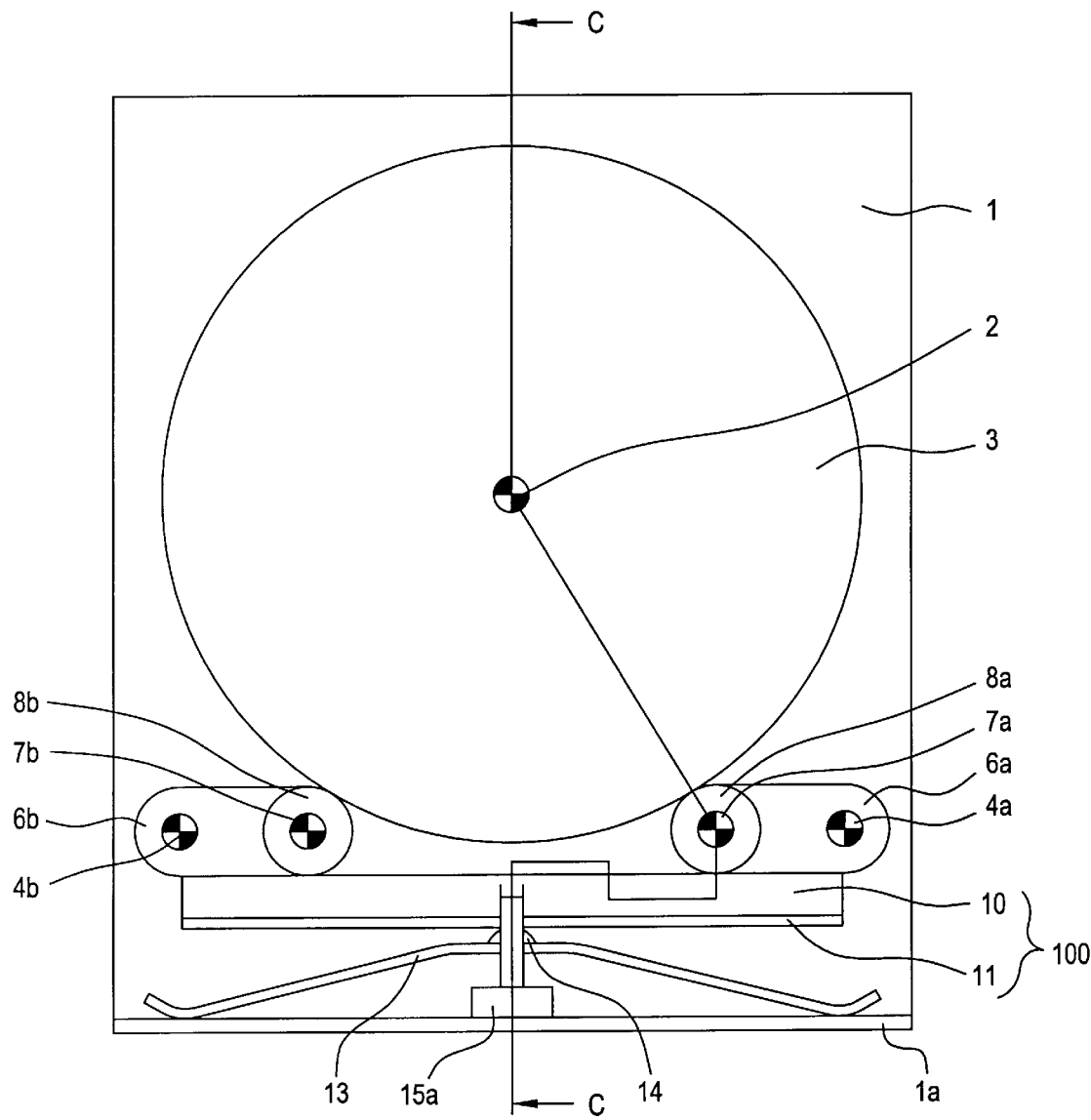
FIG. 7 is a plan view showing a fourth embodiment of a drive device according to the present invention.
Figure 8:
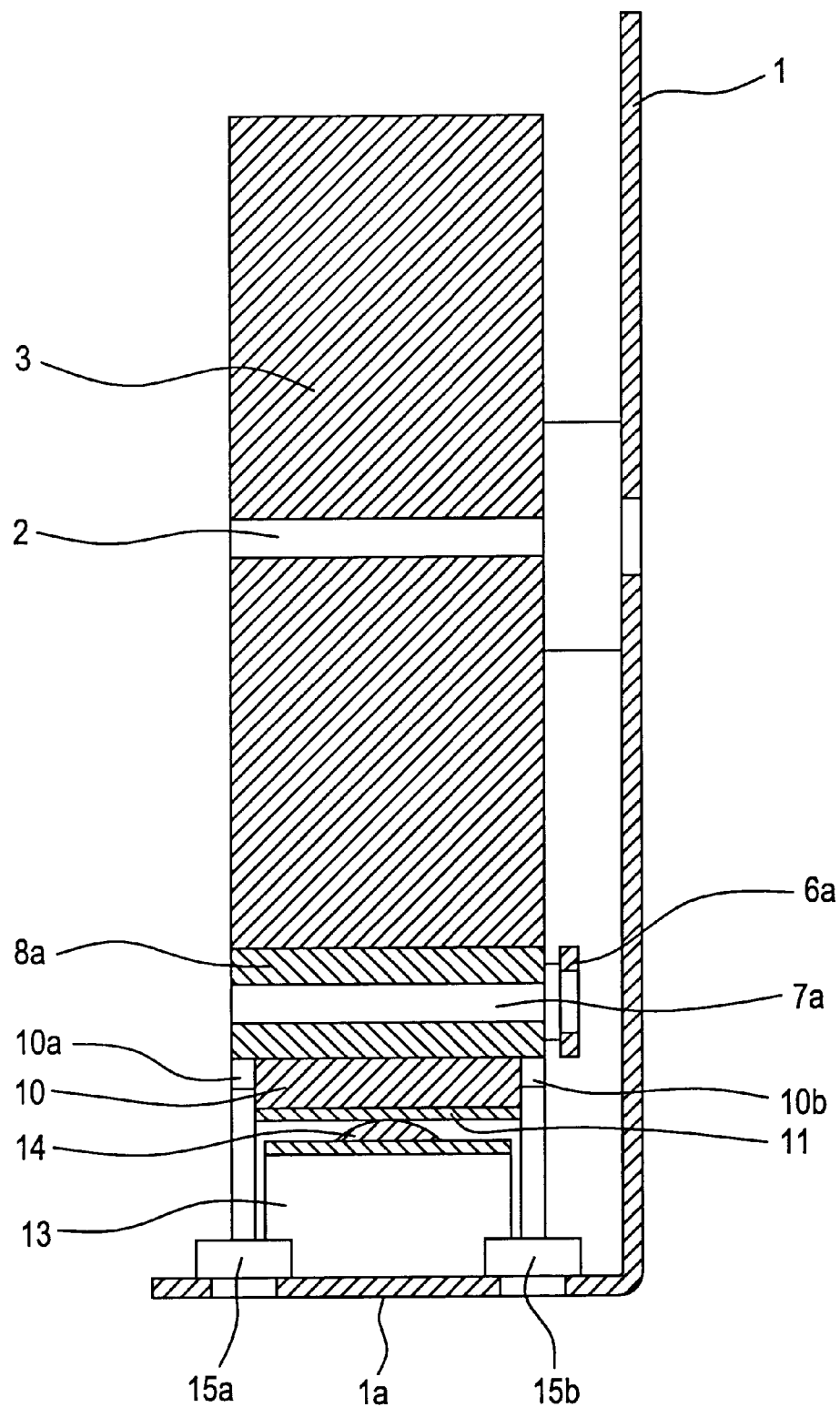
FIG. 8 is a cross-sectional view along C—C in FIG. 7.

FIG. 7 is a plan view showing a fourth embodiment of the drive device of the present invention. FIG. 8 is a cross-sectional view along C—C of the drive device in FIG. 7.

The fourth embodiment differs from the first embodiment in that sliding members 12a and 12b are not provided on elastic member 10 of vibration actuator 100. The fourth embodiment is preferred when disk 3 and elastic member 10 are made of metal and rollers 8a and 8b are made of resin, and the like.

Figure 9:
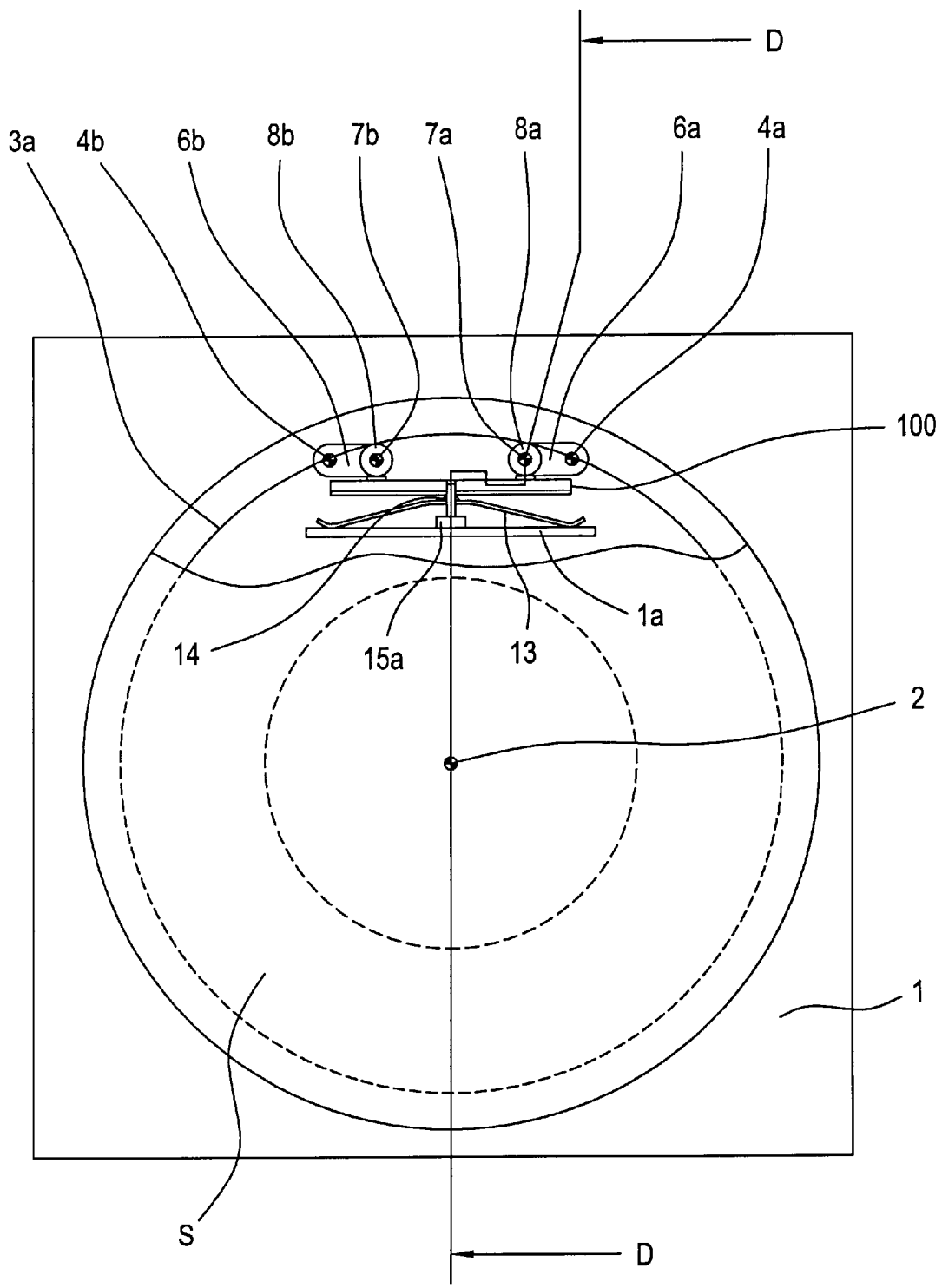
FIG. 9 is a plan view showing a fifth embodiment of a drive device according to the present invention.
Figure 10:
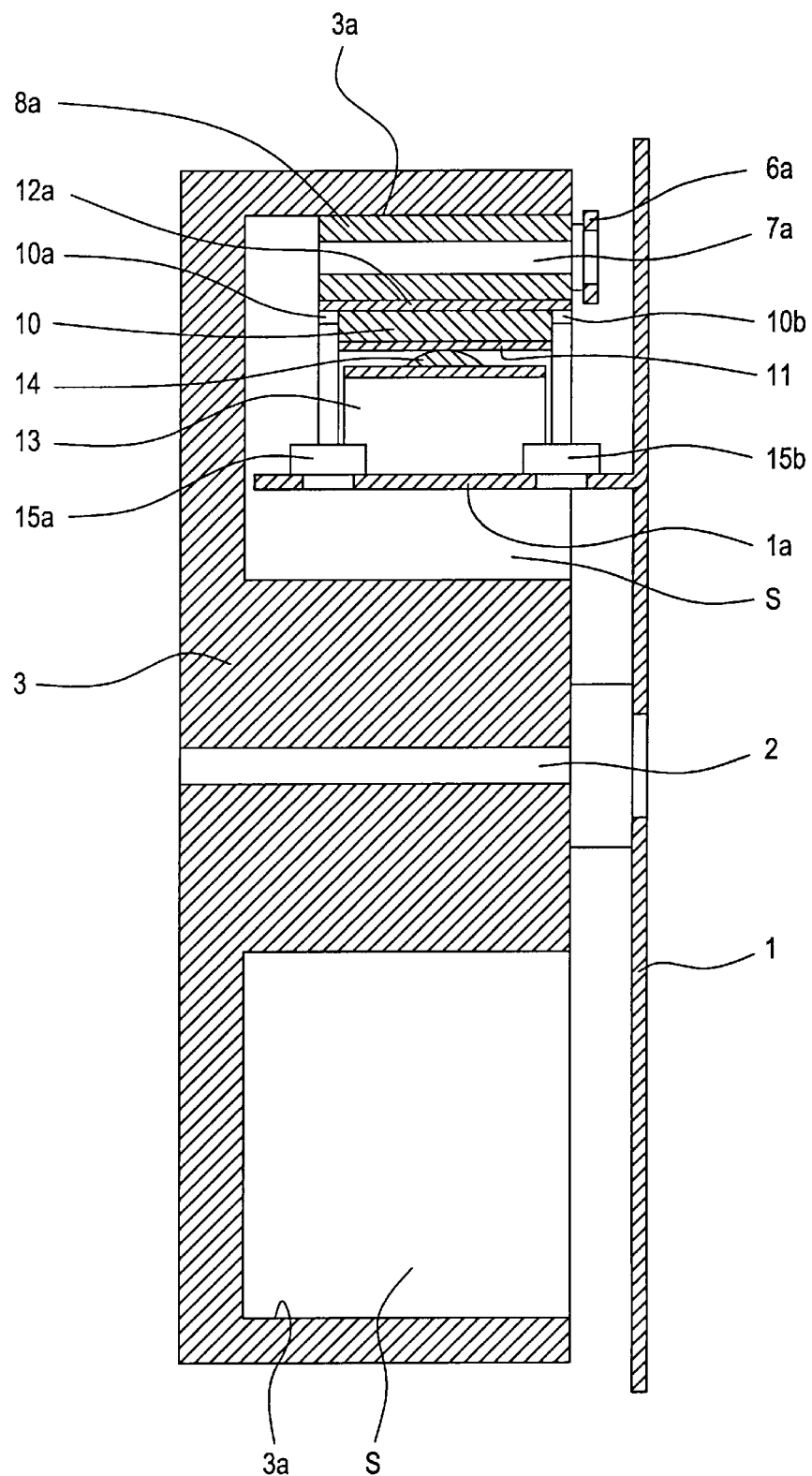
FIG. 10 is a cross-sectional view along D—D in FIG. 9.

FIG. 9 is a plan view showing a fifth embodiment of the drive device of the present invention. FIG. 10 is a cross-sectional view along D—D of the drive device in FIG. 9.

In the fifth embodiment, a grooved space S is provided on the inside of disk 3, formed in the direction of the perimeter, as shown in FIG. 10. Thus, disk 3 is cup-shaped. The drive unit is made compact compared to the first embodiment. Other than size, however, the drive unit is the same as that of the first embodiment and includes vibration actuator 100, pressing member 13, pin 15, rollers 8a and 8b, and levers 6a and 6b, and the like. The drive unit is disposed in space S of disk 3. Referring to FIG. 10, roller 8a is in contact with a sliding member 12a of vibration actuator 100 and with a curved surface 3a (i.e., a radially inward facing surface) on the inner surface of the outer perimeter of space S of disk 3. In the present embodiment, the direction in which pressing member 13 pushes vibration actuator 100 is the direction away from the center of disk 3.

In the fifth embodiment, the driving force generated by vibration actuator 100 is propagated via rollers 8a and 8b to curved surface 3a on the outer perimeter of space S formed in disk 3. Thus, disk 3 is driven to rotate.

According to the fifth embodiment, because disk 3 is driven from the inside, it is possible to make the device compact even in the planar direction. This structure is particularly suitable when the diameter of the driven disk 3 is large.

Figure 11:
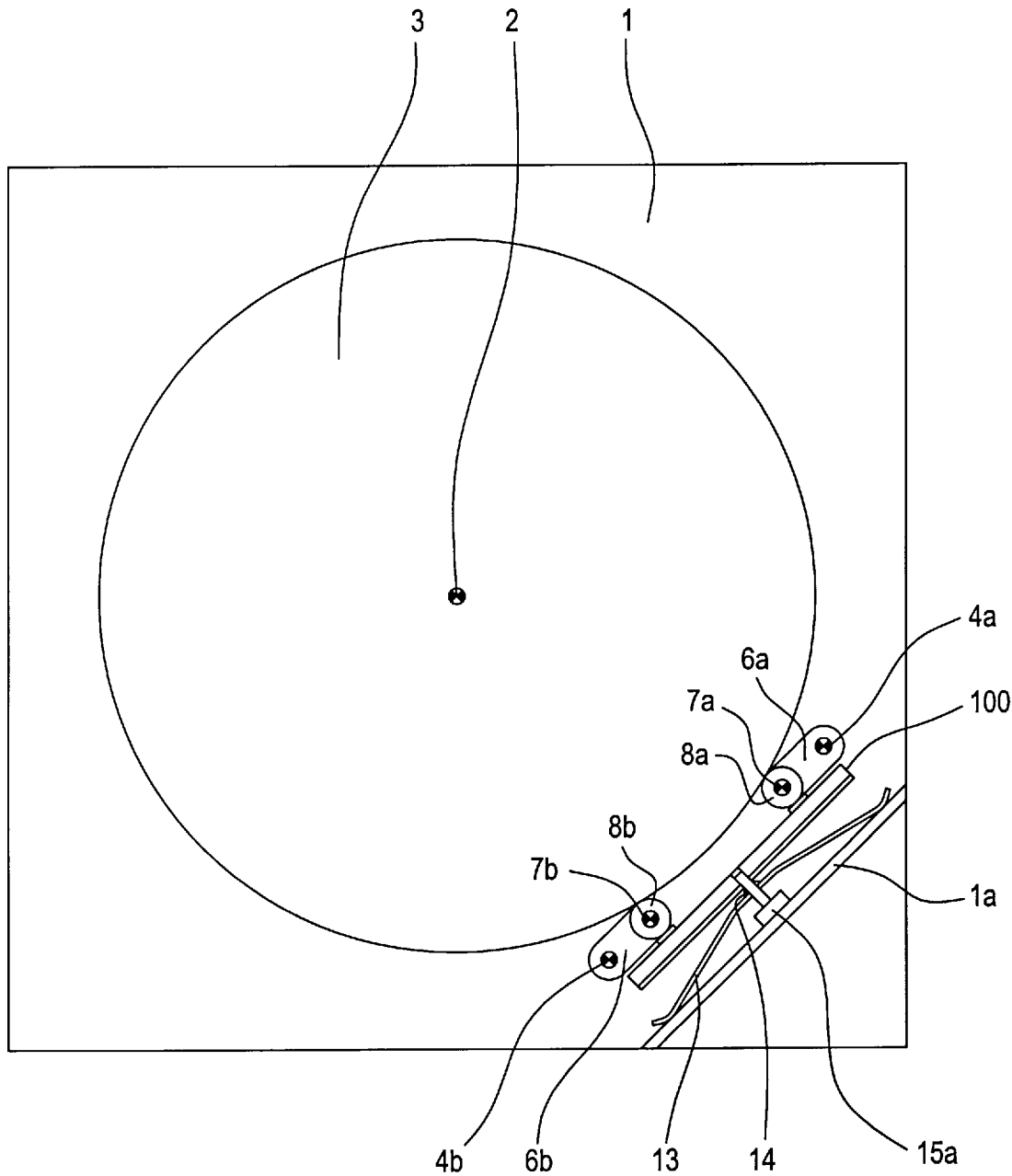
FIG. 11 is a plan view showing a sixth embodiment of a drive device according to the present invention.

FIG. 11 is a plan view showing a sixth embodiment of the drive device according to the present invention. FIG. 6 has the drive unit previously described disposed in a corner of base 1 having a rectangular plane surface. Accordingly, the dead space created in the rectangular (e.g., square) base 1 and disk 3 can be utilized effectively.

Figure 12:
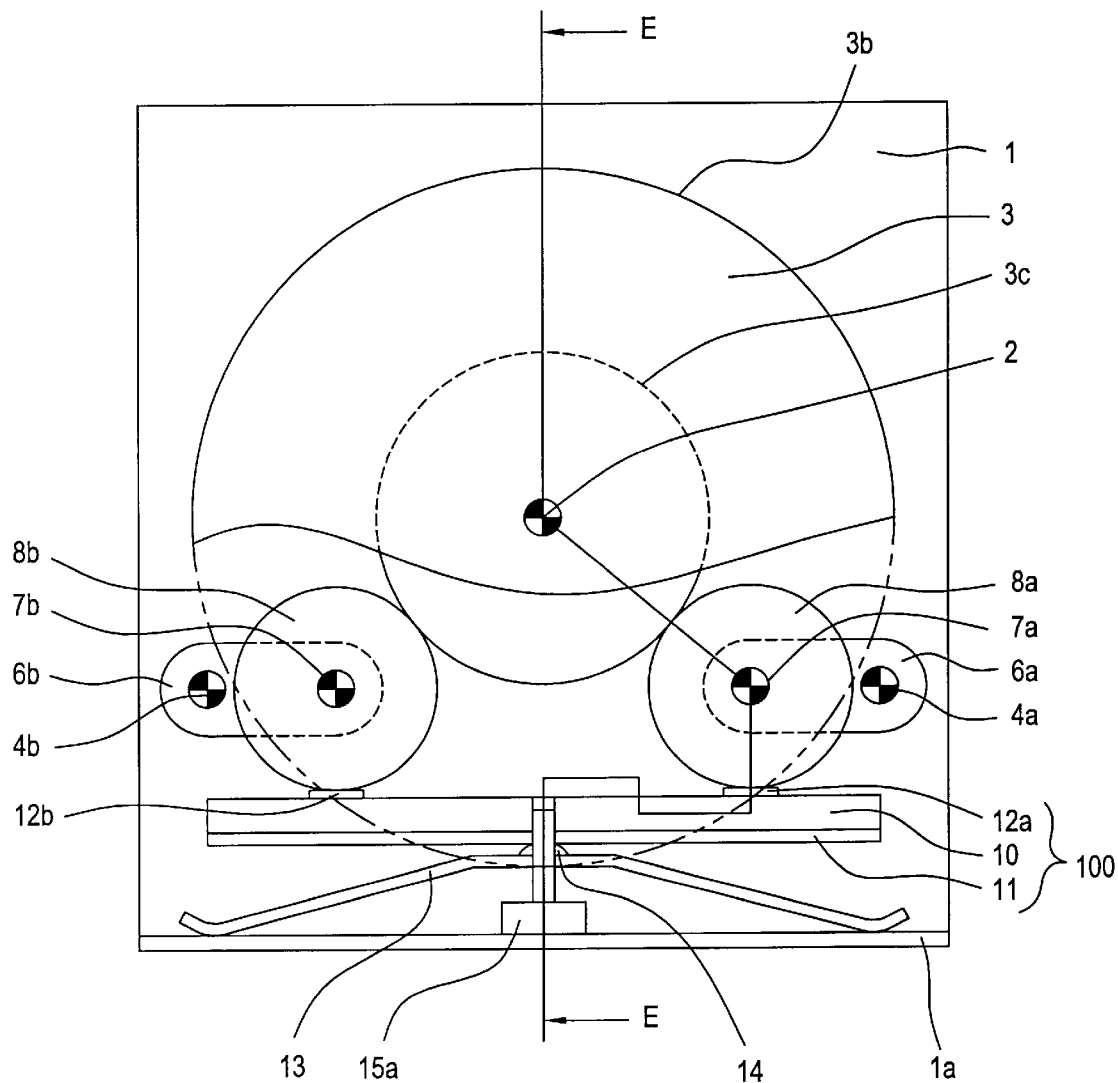
FIG. 12 is a plan view showing a seventh embodiment of a drive device according to the present invention.
Figure 13:
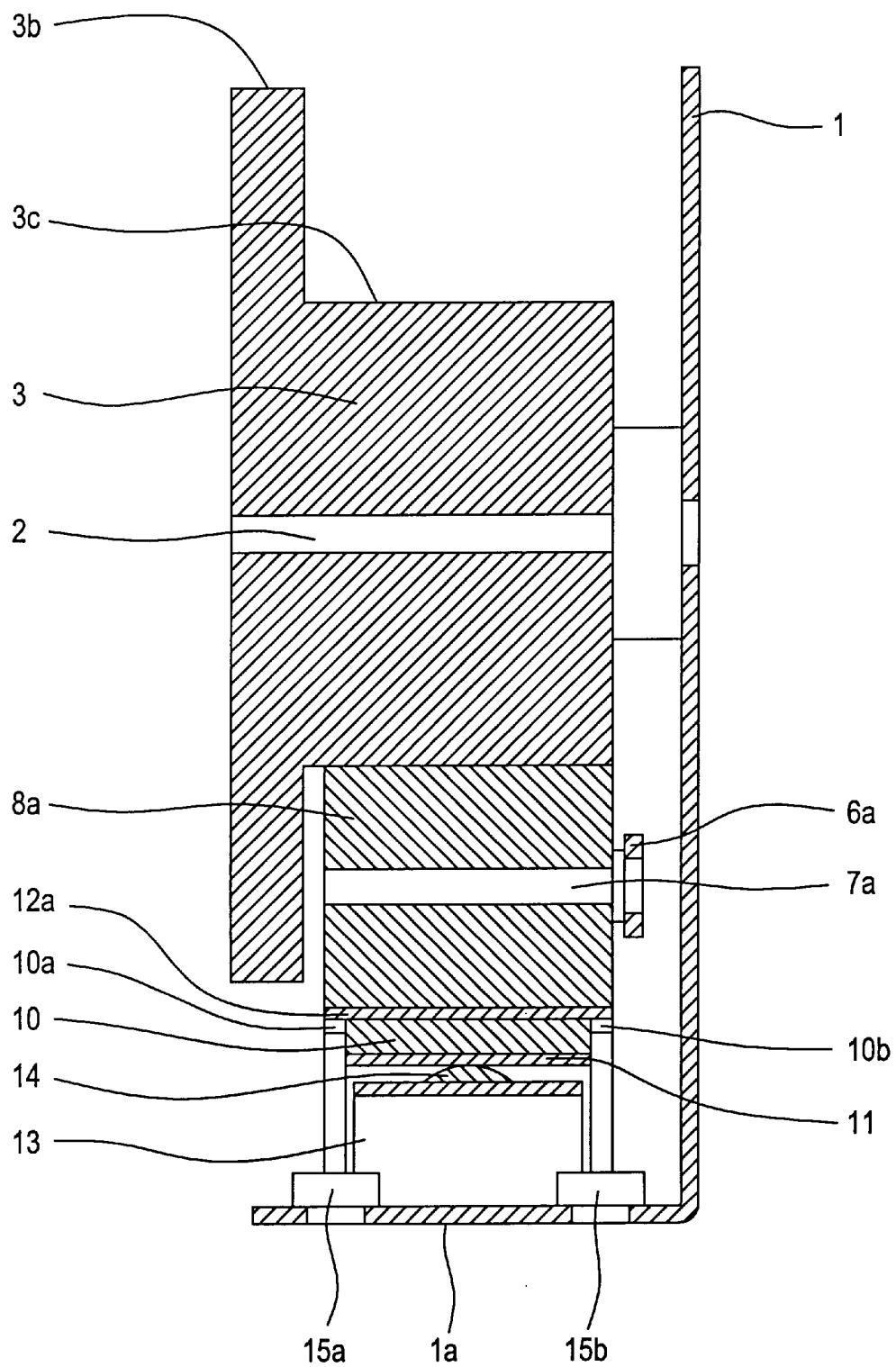
FIG. 13 is a cross-sectional view along E—E in FIG. 12.

FIG. 12 is a plan view showing a seventh embodiment of the drive device of the present invention. In FIG. 12, for the sake of explanation, one part of disk 3 is shown in a cut-open state. FIG. 13 is a cross-sectional view along E—E of the drive device in FIG. 12.

In the seventh embodiment, disk 3 is constituted by a first part 3b having a large diameter and a second part 3c having a smaller diameter than part 3b. Also, rollers 8a and 8b are in contact with the outer perimeter of the second part 3c.

In the configuration of the seventh embodiment, when the identical drive unit (as the first embodiment) is used and the diameter of the first part 3b of disk 3 is set to the same size as the diameter of disk 3 of the first embodiment, the diameter of rollers 8a and 8b are set larger than in the first embodiment. Therefore, the speed of rotation of disk 3 can be raised compared with the first embodiment.

Because rollers 8a and 8b are not effected by the speed of rotation of disk 3, that speed may be set suitably in the design, considering the space of the device, and the like.

As explained in detail above, according to the present invention, by pressing the vibration actuator in contact in a direction substantially orthogonal to the axis of the driven member from the side of the driven member, the driven member can be driven to rotate. Therefore, the vibration actuator, roller member, and driven member can be disposed on the identical plane substantially orthogonal to the axis of rotation of this driven member, and it becomes possible to make the device compact in the direction of the axis of the driven member.

Also, the present invention is not limited to the embodiments explained above. Various modifications and variations are possible.

For example, in each embodiment, the disk 3 functioned as a turntable. However, when the information recording medium is fabricated from a hard material, the information recording medium may be directly driven to rotate, like the disk 3. In this case, a mechanism for clamping the disk 3 should be provided that is capable of rotation.

Also, as long as no logical contradictions are caused, the characteristics of each embodiment can be combined with other embodiments. For example, other than for the fourth embodiment, the sliding member can be omitted. Also, the structure of the drive unit of the second embodiment can be applied to the placement of the drive unit of the fourth and fifth embodiments.

The described vibration actuator used a first-order longitudinal vibration and a fourth-order bending vibration (L1-B4 type). The invention is not limited to this type of actuator. For example, the vibration actuator may also be made in a configuration using a sixth-order bending vibration (L1-B6 type), or the like.

Additionally, a piezoelectric member was used as the electromechanical conversion element. The invention is not limited to this type of electromechanical conversion element. The invention is applicable to other devices that convert electrical energy into mechanical displacement. For example, an electrostrictive element may be used instead of the piezoelectric member.

While this invention has been described in conjunction with specific embodiments thereof, it is evident that many alternatives, modifications and variations will be apparent to those skilled in the art. Accordingly, the preferred embodiments of the invention set forth herein are intended to be illustrative, not limiting. Various changes may be made without departing from the spirit and scope of the invention as defined in the following claims.

What is claimed is:

1. A drive device comprising:
   a base;
   a driven member rotatably mounted to the base and having a circular surface following the direction of rotation;
   a roller member contacting the circular surface of the driven member, and capable of rotation together with the driven member;
   a vibration actuator contacting the roller member to rotatably drive the roller member; and
   a pressing member that presses the vibration actuator in a direction substantially orthogonal to an axis of rotation of the driven member.

2. The drive device of claim 1, wherein the vibration actuator includes a rectangular flat plate-shaped vibration element, and drives the roller member to rotate by generating a longitudinal vibration and a bending vibration in the vibration element to generate an elliptical movement in a specified position of the vibration element, the specified position contacting the roller member.

3. The drive device of claim 1, wherein the driven member and the vibration actuator are disposed on a common plane substantially orthogonal to the axis of rotation of the driven member.

4. The drive device of claim 1, wherein the axis of rotation of the driven member and the axis of rotation of the roller member are substantially parallel.

5. The drive device of claim 1, wherein the axis of rotation of the roller member is movably attached to the base so as to be capable of moving along a plane of the base.

6. The drive device of claim 5, further comprising:

a roller support member for supporting the roller member, the roller support member having an axis member mounted to the base and a main body supported on the axis member so as to be capable of rotation centered on the axis member; and the roller member is rotatably mounted to the main body.

7. The drive device of claim 6, wherein the main body of the roller support member is contained in a plane substantially parallel to the plane orthogonal to the axis of rotation of the driven member, and is supported so as to be capable of rotation centered on the axis member.

8. The drive device of claim 6, wherein:

the vibration actuator includes a first driving force output member and a second driving force output member;

the roller member includes a first roller in contact with the first driving force output member and a second roller in contact with the second driving force output member; and the roller support member includes a first roller support member and a second roller support member that independently support the first roller and the second roller, respectively.

9. The drive device of claim 6, wherein:

the vibration actuator includes a first driving force output member and a second driving force output member;

the roller member includes a first roller in contact with the first driving force output member and a second roller in contact with the second driving force output member; and the roller support member includes a first member supported on the axis member so as to be capable of rotation centered on the axis member, a second member supporting the axis of rotation of the first roller and the axis of rotation of the second roller, and a linking member linking the first member and the second member so as to be capable of mutual rotation.

10. The drive device of claim 5, further comprising:

a first support member and a second support member supporting the driven member; and wherein:

the vibration actuator includes a first driving force output member and a second driving force output member; and the first support member is disposed in a position symmetrical in relation to a center of the first roller and the driven member, and the second support member is disposed in a position symmetrical in relation to a center of the second roller and the second driven member.

11. The drive device of claim 5, wherein:

the driven member includes a first part having a first diameter and a second part having a second diameter smaller than the first diameter; and the roller member contacts the second part of the driven member.

12. The drive device of claim 1, wherein the base has a rectangular flat shape, and the vibration actuator is disposed in a corner of the base.

13. An information recording and processing device including the drive device of claim 1, wherein:

the driven member is an information recording medium; and reading and/or writing of information is performed by the information recording and processing device against the information recording medium.

14. An information recording and processing device including the drive device of claim 1, wherein:

the driven member is a turntable for mounting an information recording medium; and reading and/or writing of information is performed by the information recording and processing device against the information recording medium.

15. The drive device of claim 1, wherein the driven member is an information recording medium.

16. The drive device of claim 1, wherein the driven member is a turntable for mounting an information recording medium.

17. The drive device of claim 1, wherein the roller member contacts a radially outward facing surface of the driven member.

18. The drive device of claim 1, wherein the roller member contacts a radially inward facing surface of the driven member.

19. The drive device of claim 1, wherein:

the vibration actuator includes a first driving force output member and a second driving force output member; and the roller member includes a first roller in contact with the first driving force output member and a second roller in contact with the second driving force output member, the first and second rollers each contacting the circular surface of the driven member.

20. The drive device of claim 1, wherein the vibration actuator includes a piezoelectric element that causes the vibration actuator to vibrate.

* * * * *